United States Patent [19]

Yamanishi

[11] Patent Number: 4,816,902
[45] Date of Patent: Mar. 28, 1989

[54] METHOD FOR CONTINUOUSLY PREPARING FILMS FOR USE IN MAKING PRINTING PLATES FOR OFF SET LITHOGRAPHY AND IMAGE-FORMING APPARATUS FOR PREPARING THE FILMS

[75] Inventor: Eiichi Yamanishi, Kawasaki, Japan

[73] Assignee: Kabushiki Kaisha Toshiba, Kawasaki, Japan

[21] Appl. No.: 30,069

[22] Filed: Mar. 25, 1987

[30] Foreign Application Priority Data

Jun. 16, 1986 [JP] Japan .............................. 61-139822
Jul. 22, 1986 [JP] Japan .............................. 61-172254
Jul. 22, 1986 [JP] Japan .............................. 61-172255

[51] Int. Cl.$^4$ ............................................. H04N 1/46
[52] U.S. Cl. ................................ 358/75; 346/76 PH; 355/4; 101/468
[58] Field of Search ........................... 358/75, 78, 296; 346/76 PH; 355/4; 101/135, 463.1, 468

[56] References Cited

U.S. PATENT DOCUMENTS 4,631,577 12/1986 Yamanishi .............................. 358/75
4,668,978 5/1987 Gokita .................................... 358/75

Primary Examiner—James J. Groody
Assistant Examiner—Robert M. Bauer
Attorney, Agent, or Firm—Cushman, Darby & Cushman

[57] ABSTRACT

A photoelectric transducer receives the light reflected from an original, and outputs color signals representing cyan, green, and yellow. These colors signals are processed by a signal-splitting circuit and a signal-converting circuit, and are thereby converted to image-forming signals representing yellow, magenta, cyan, and black. When a print key of a control panel is depressed, a main control section instructs the signal-converting circuit to continuously output the image-forming signals. In accordance with the output image-forming signals, images are continuously formed on a plastic film, by using an ink ribbon. Hence, a yellow image, a magenta image, a cyan image and a black image can be formed on four plastic films, respectively. These plastic films can be used in making plates to print a multicolor image.

13 Claims, 16 Drawing Sheets

F I G. 5
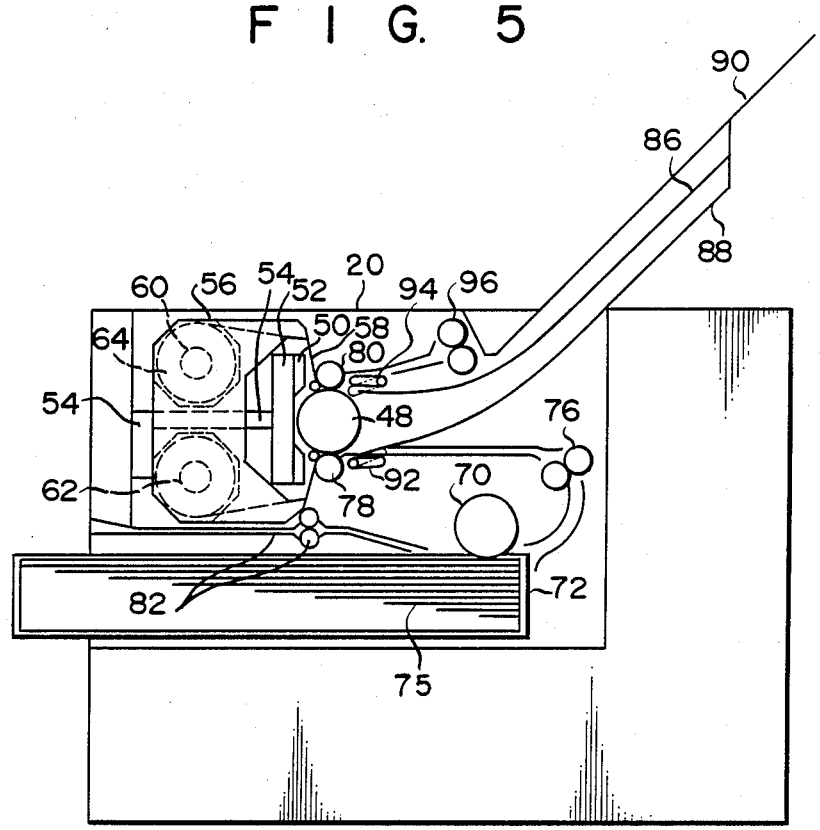

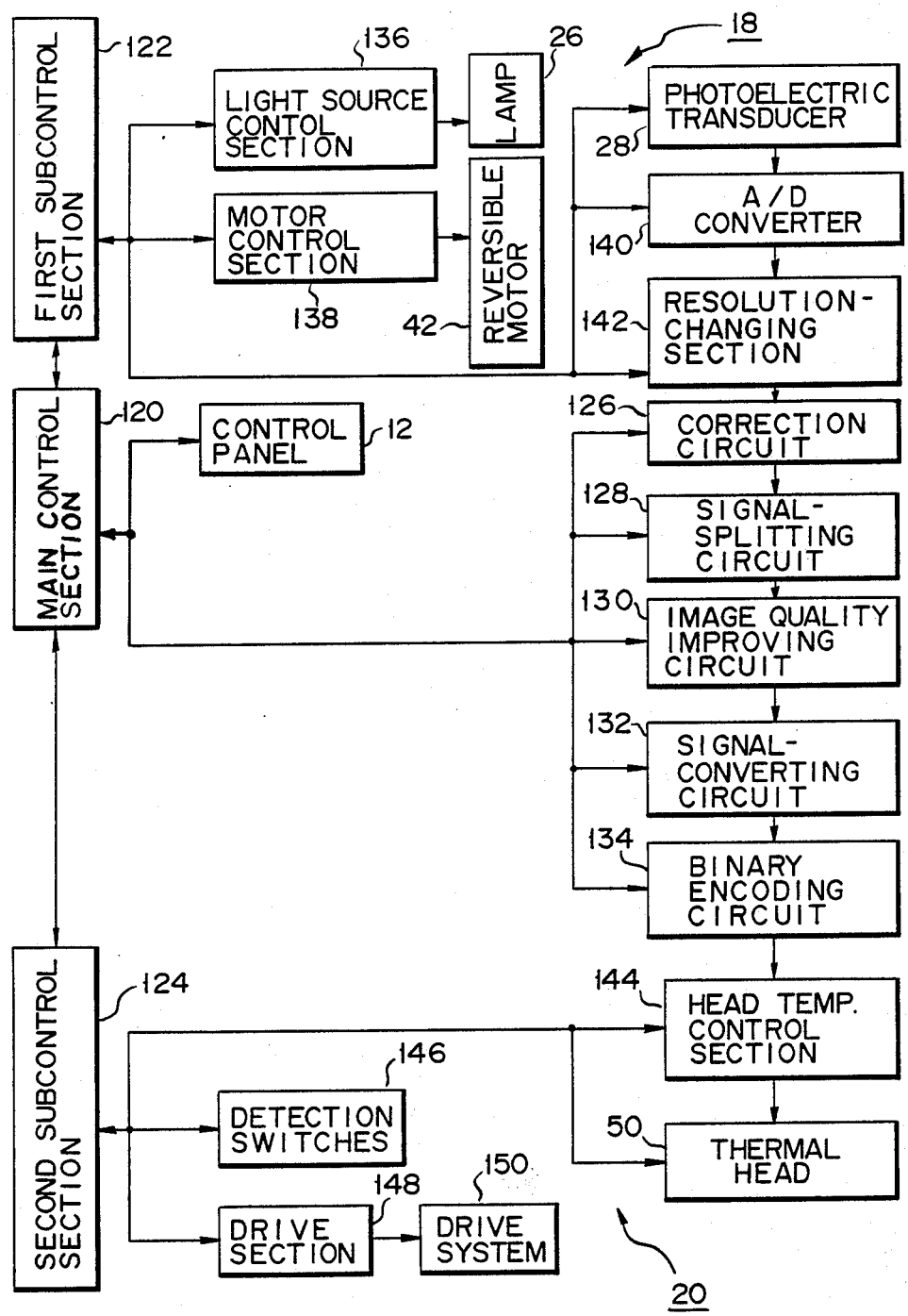
F I G. 9

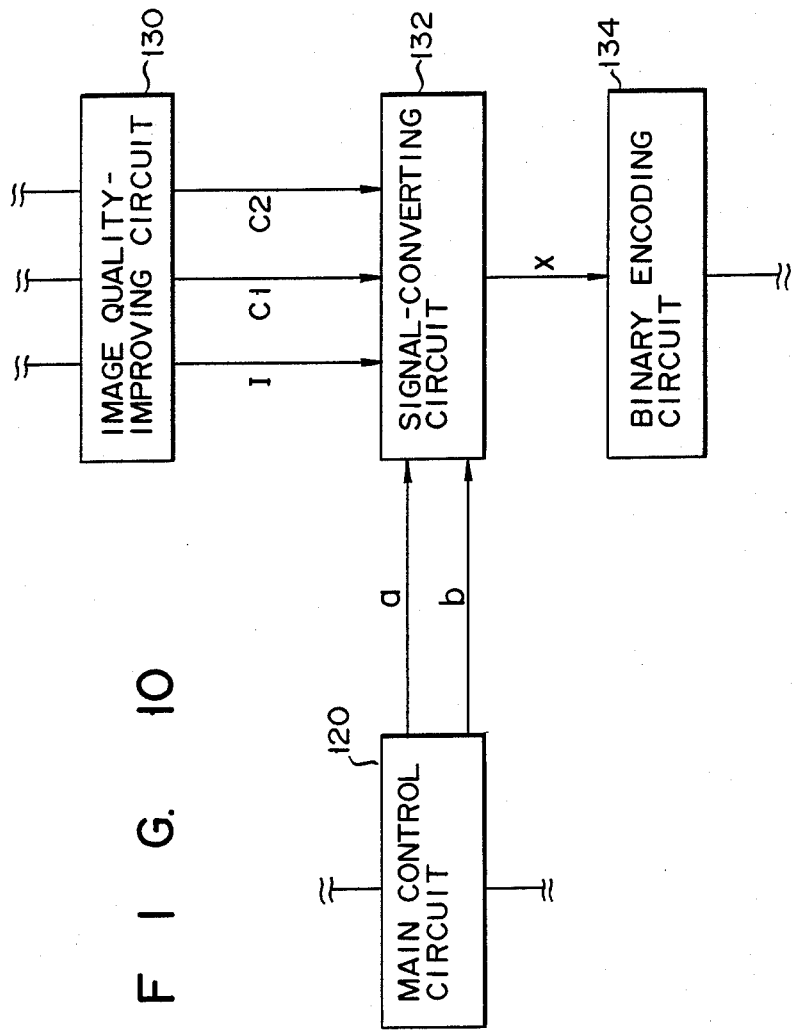

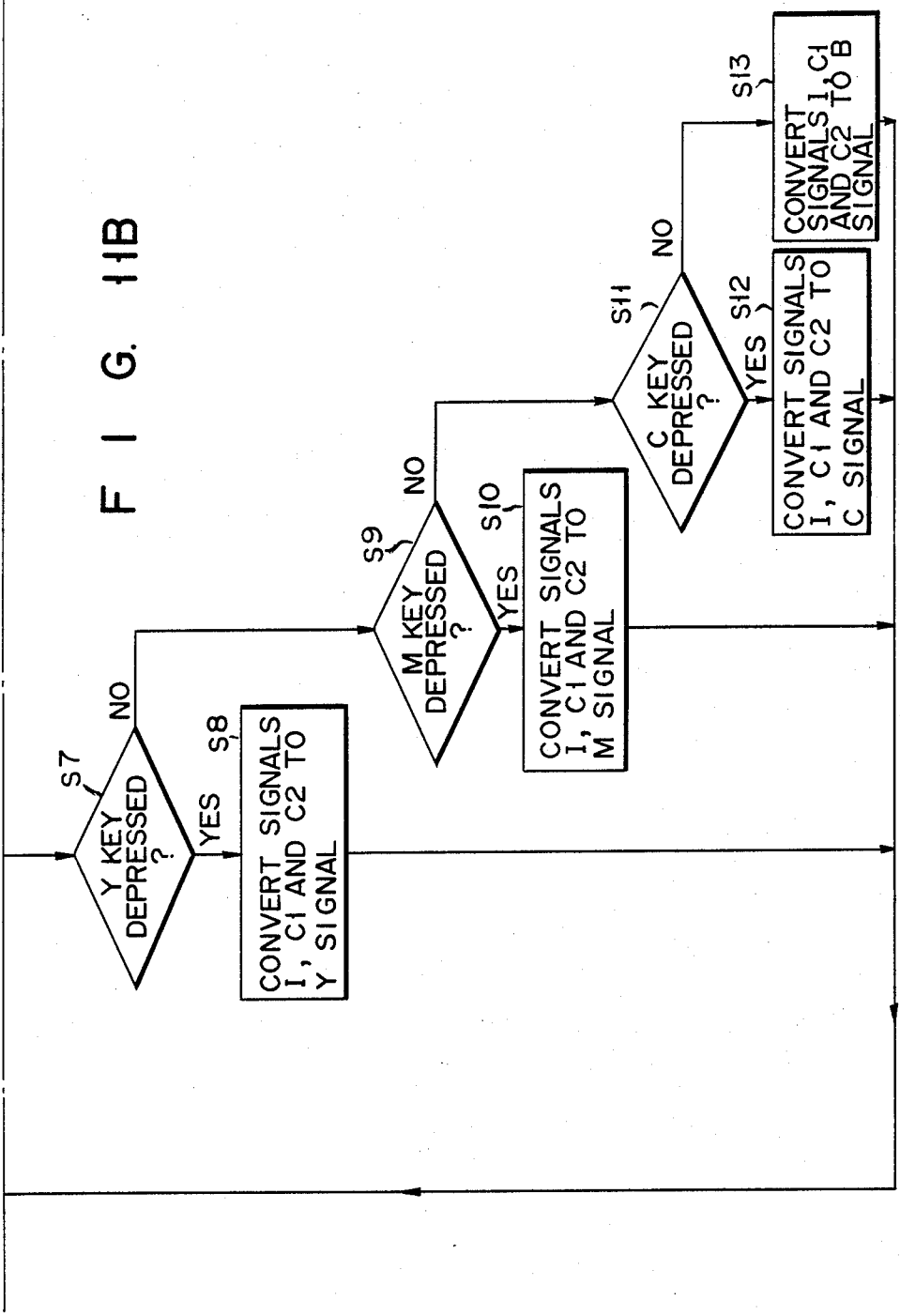

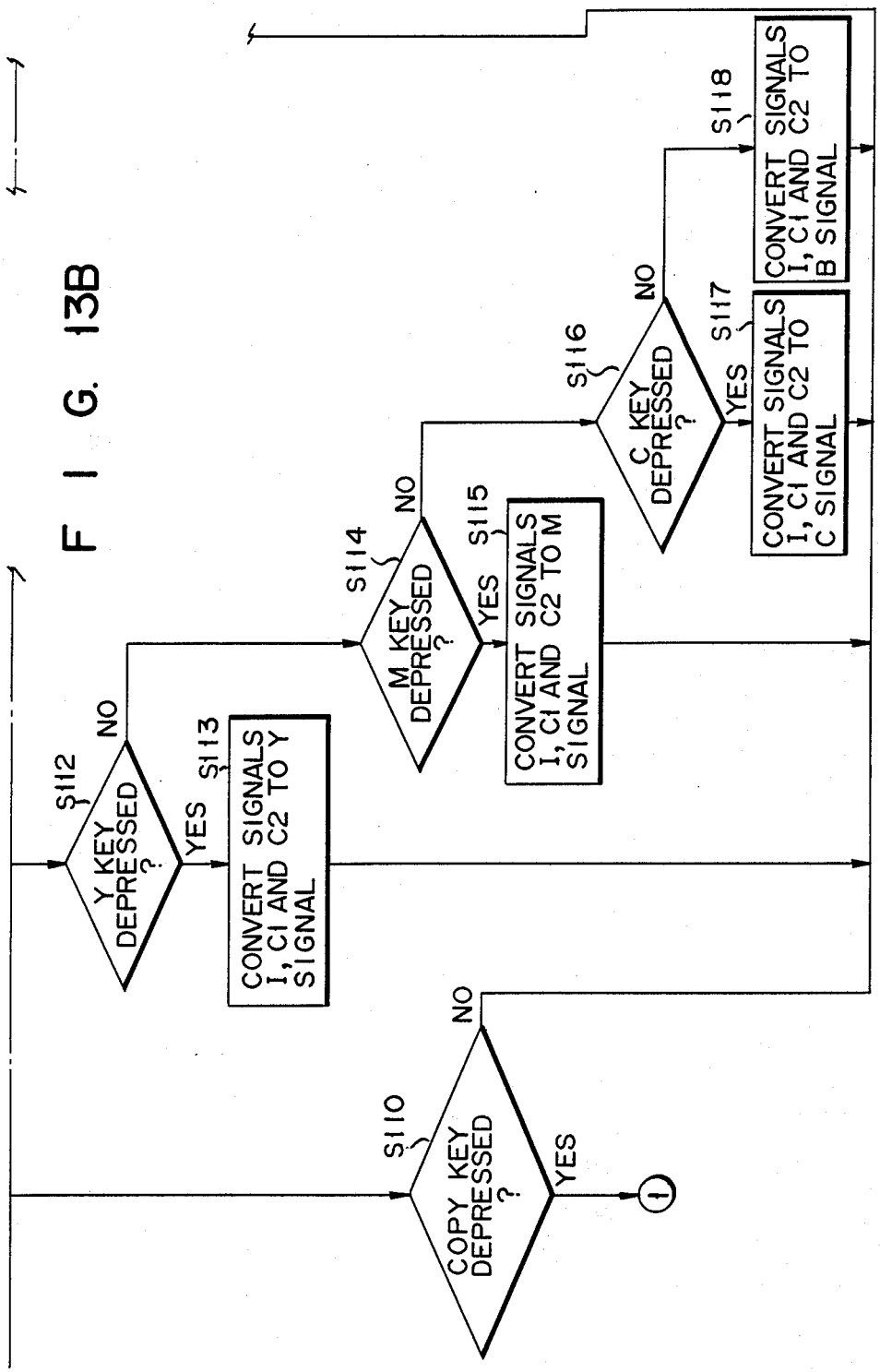
F I G. 13B

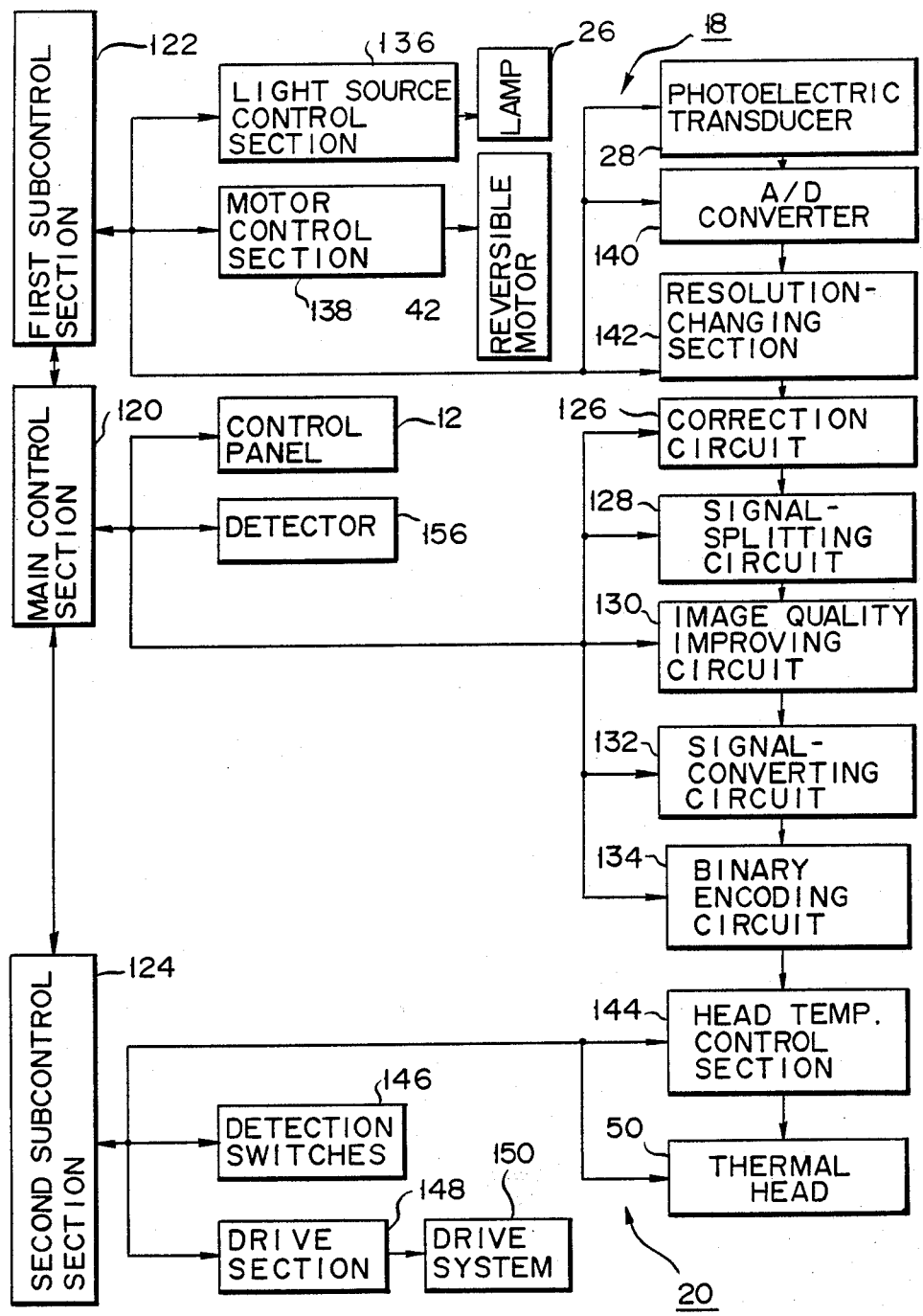
F I G. 16

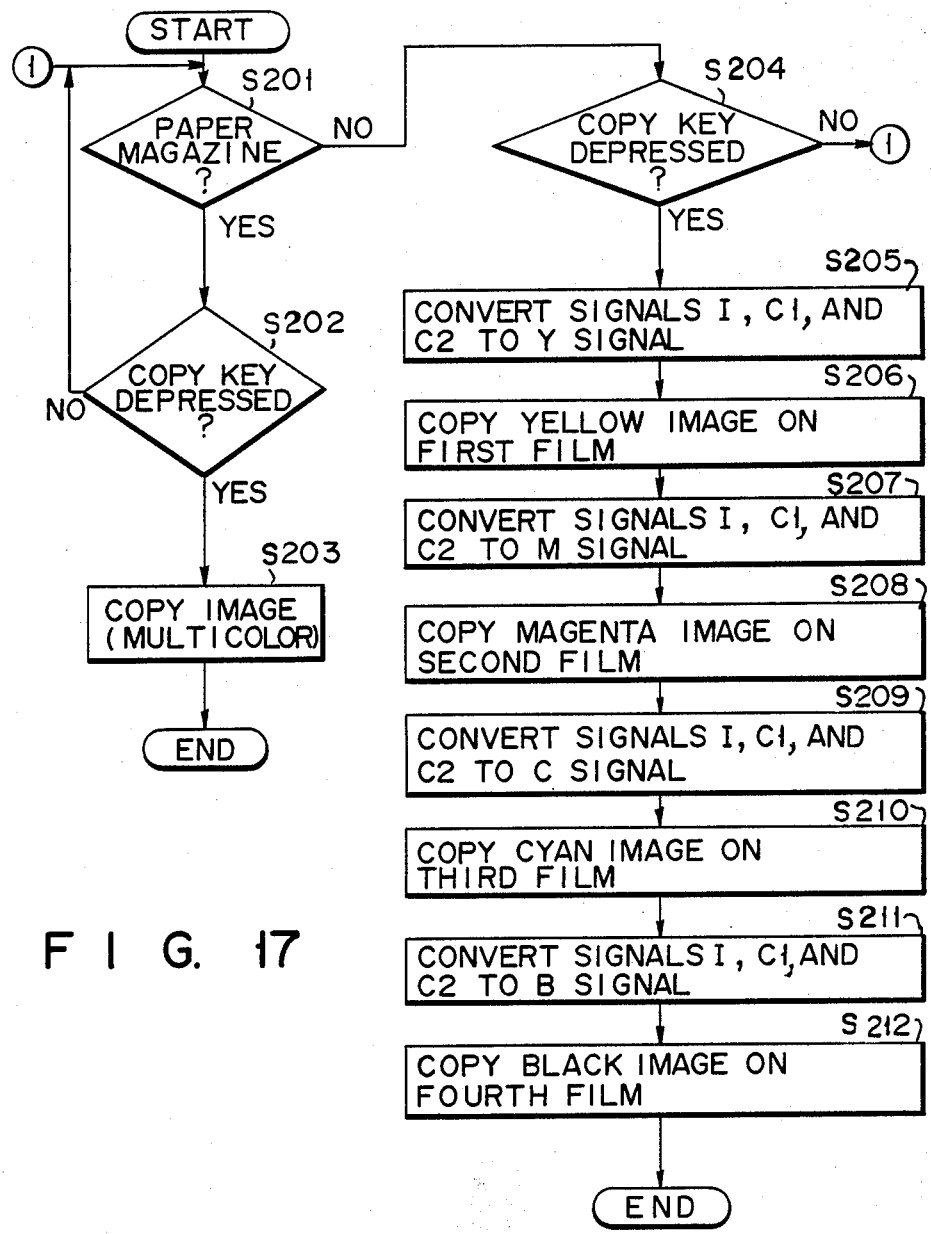
F I G. 17

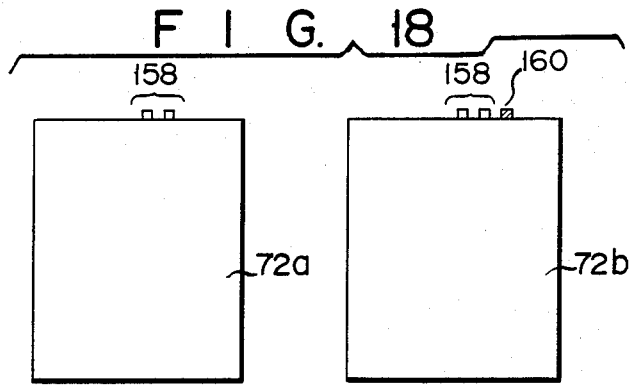
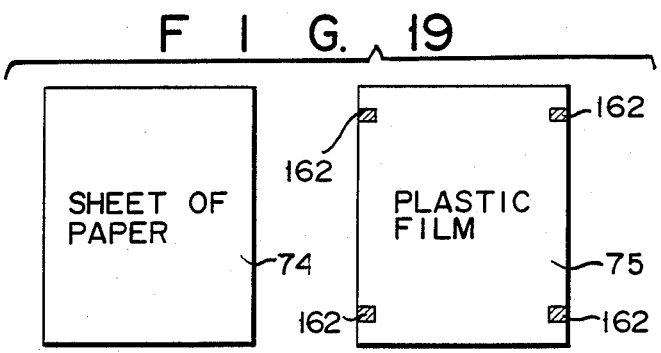
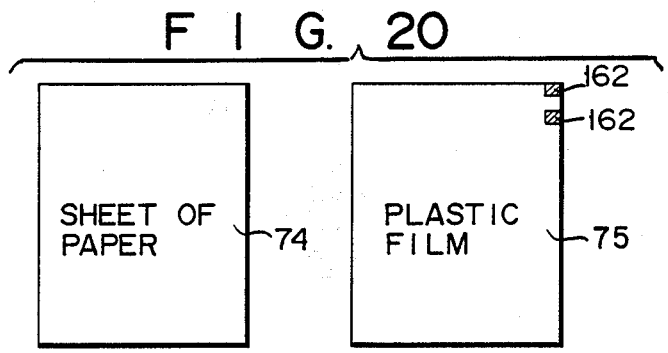

METHOD FOR CONTINUOUSLY PREPARING FILMS FOR USE IN MAKING PRINTING PLATES FOR OFF SET LITHOGRAPHY AND IMAGE-FORMING APPARATUS FOR PREPARING THE FILMS

BACKGROUND OF THE INVENTION

The present invention relates to an image-forming apparatus and method, and more particularly to an image-forming apparatus and method for preparing positive or negative films for use in making printing plates for offset lithography.

Recently, printing and plate-making technology have advanced remarkably, along with the progress of electronic technology. Today the electronic plate-making technique is dominant. Printing plates are made electronically in the following way. First, an original, with an image formed on it, is optically scanned. The light refelected from the original is converted into electrical signals representing the densities of the respective picture elements forming the image. These signals are converted into light beams of different intensities. The light beams are applied to a film (i.e., photosenstive material). The film, thus exposed, is developed, whereby a positive or negative film is prepared. The positive or negative is used to make a printing plate.

This method of preparing positive or negative films consists of many steps. The apparatus for performing this method is inevitably complicated, large and expensive. The conventional apparatuses can prepare one film for one color at a time. Further, since the apparatuses are designed for preparing films for making printing plates, they cannot be used for other purposes.

SUMMARY OF THE INVENTION

Accordingly, the object of the present invention is to provide an image-forming apparatus which is small, simple and inexpensive, and a method which can, nonetheless, easily prepare films for making printing plates.

According to the present invention, there is provided an image-forming apparatus which can scan a multicolor original image and form images of different colors on image-forming media, respectively. The apparatus comprises scanning means, signal converting means, and image forming means. The scanning means scans the original image and generates color signals representing different colors. The signal-converting means converts the color signals supplied from the scanning means to image-forming signals representing different colors. The image-forming means responds to any image-forming signal supplied from the signal converting means, and forms an image of the color represented by this signal, on an image-forming media, by using an image-transfer medium of the color represented by the image-forming signal. When a print key of a control panel is depressed, a main control section instructs the signal-converting circuit to continuously output the image forming signals. In accordance with the output image forming signals, images are continuously formed by using an ink ribbon

BRIEF DESCRIPTION OF THE DRAWINGS

FIG. 5 is a cross-sectional view of the image-forming section of the image-forming apparatus illustrated in FIG. 1;

FIG. 9 is a block diagram showing the control system of the image-forming apparatus of FIG. 1;

FIG. 10 is a block diagram representing the color signal-converting circuit shown in FIG. 9;

FIGS. 11A and 11B are flow charts explaining the operation of the image-forming apparatus shown in FIG. 1;

FIGS. 13A to 13C are flow charts explaining the operation of the image-forming apparatus according to the second embodiment of the invention;

FIG. 16 is a block diagram illustrating the control system of the image-forming apparatus according to the third embodiment of the invention;

FIG. 17 is a flow chart explaining the operation of the third embodiment;

FIG. 18 shows the shape of a paper magazine and the shape of a film magazine, both used in the image-forming apparatus according to the third embodiment;

FIG. 19 shows a sheet of paper and a plastic film, both used in the third embodiment; and FIG. 20 shows a sheet of paper and another type of a plastic film, both used in the third embodiment.

DETAILED DESCRIPTION OF THE PREFERRED EMBODIMENTS

Figure 1:
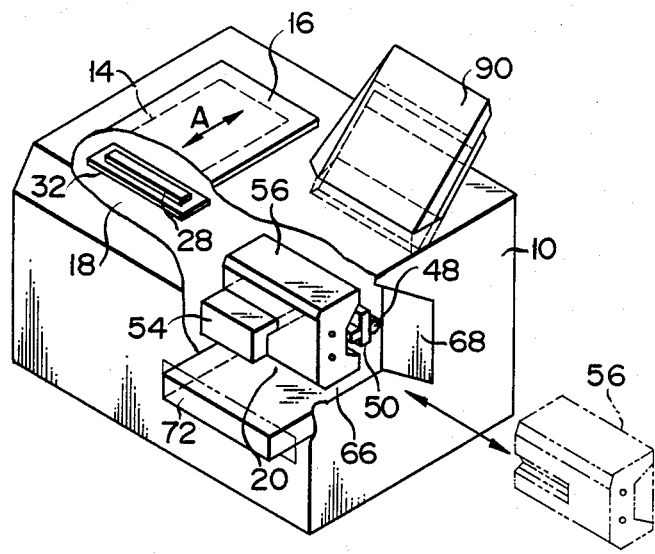
FIG. 1 is a partially cutaway, perspective view of an image-forming apparatus according to a first embodiment of the present invention.
Figure 2:
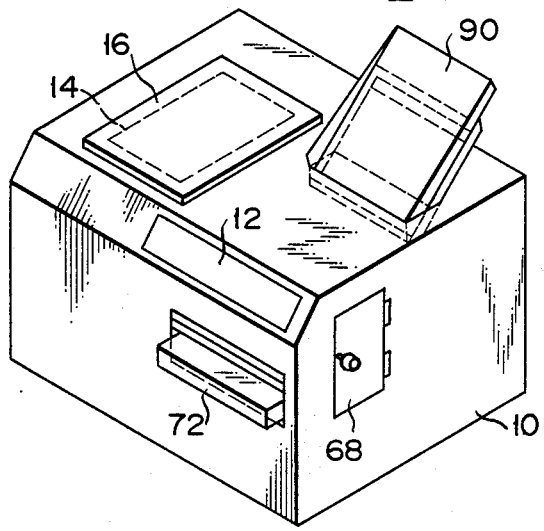
FIG. 2 is another perspective view of the image-forming apparatus.

FIGS. 1 and 2 show an image-forming apparatus, a first embodiment of the invention, more precisely a thermal-printing, color copier which can selectively copy multicolor images and prepare films for making printing plates. As is shown in these figures, the copier comprises housing 10 and control panel 12 provided on the slanting front side of housing 10. Original table 14 is provided on the top of housing 10, to the left. Cover 16 is provided on original table 14. Cover 16 can be opened and closed. Original-scanning section 18 is located within housing 10, below original table 14. This section is designed to scan the original placed on table 14, thereby to read data from the original. Further, image-forming section 20 is provided within the right portion of housing 10.

Figure 3:
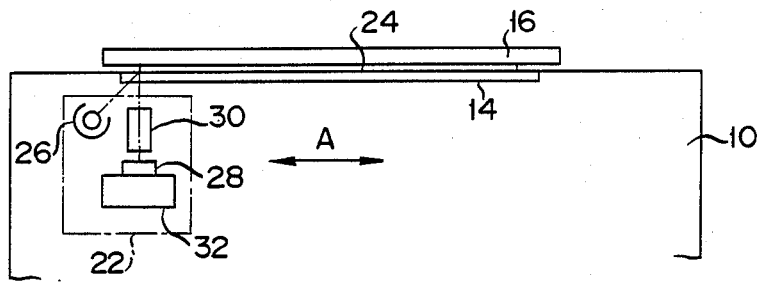
FIG. 3 is a side view of the original-scanning section of the image-forming apparatus shown in FIG. 1.
Figure 4:
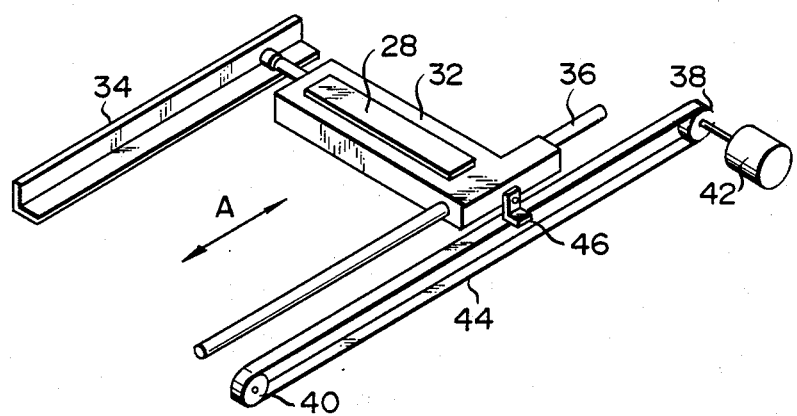
FIG. 4 is a perspective view of the scanner-driving mechanism provided in the original-scanning section shown in FIG. 3.

As is shown in FIGS. 3 and 4, original-scanning section 18 comprises scanner 22 located below original table 14 secured to the top of housing 10. Scanner 22 is designed to move back and forth along table 14, in the directions of arrows A, thereby to optically scan original 24 set on table 14 and thus read data from original 24.

Scanner 22 comprises lamp 26 for illuminating original 24, photoelectric transducer 28 for receiving the light reflected from original 24, optical system 30 for guiding the reflected light to transducer 28, and carriage 32 which supports lamp 26, transducer 28 and optical system 30. Photoelectric transducer 28 converts the received light into color signals which correspond to cyan-, green-, and yellow- components (or red-, green-, and blue- components) of the color of each picture element forming the image on original 24. More specifically, transducer 28 outputs cyan-, green- and yellow- signals (or red-, green- and blue-signals). The main component of transducer 28 is, for example a CCD line image sensor.

As is illustrated in FIG. 4, carriage 32 can reciprocate in the directions of arrows A, guided by guide rail 34 and guide shaft 36. Driving pulley 38 is provided near one end of guide shaft 36, and driven pulley 40 is provided near the other end of shaft 36. Driving pulley 38 is coupled to reversible motor 42 (e.g., a pulse motor) and can be rotated by this motor. Timing belt 44 is wrapped around driving pulley 38 and driven pulley 40. One portion of timing belt 44 is fastened to carriage 32 by fastening member 46. Therefore, carriage 32 moves linearly when motor 42 rotates in the forward and backward directions.

As is shown in FIG. 5, image-forming section 20 comprises platen 48, thermal head 50, radiator 52, and holder 54. Platen 48 is located substantially in the middle of section 20. Thermal head 50 is arranged to the left of platen 48 and opposes platen 48. Thermal head 50 is attached to radiator 52 which is secured to the rear of holder 54. Ribbon cassette 56 is detachably mounted on holder 54. Cassette 56 contains a roll of heat-transfer ink ribbon 58. Cassette 56 is set such that a portion of ribbon 58 is inserted between platen 48 and thermal head 50.

Ribbon cassette 56 has two parallel shafts 60 and 62. One end of ribbon 58 is connected to shaft 60, and the other end of ribbon 58 is connected to shaft 62. Hence, the roll of ribbon 58 is wound partly around shaft 60 and partly around shaft 62. The ribbon is contained in case 64 of cassette 56, except for that portion inserted in the gap between platen 48 and head 50. Either shaft 60 or 62 is coupled to the shaft of a motor by a coupling mechanism (not shown) when cassette 56 is mounted on holder 54. Hence, the ribbon is fed in one direction when this motor is rotated. As is shown in FIG. 1, cassette 56 can be inserted into housing 10, and pulled therefrom, through port 66 cut in the right side of housing 10. Port 66 is usually closed by cover 68.

As is illustrated in FIG. 5, paper-supplying roller 70 is provided in the rear portion of housing 10, and magazine 72, containing a stack of sheets 74 of paper or a stack of plastic films 75, is inserted in housing 10 and located below platen 48 and paper-supplying roller 70. When roller 70 is rotated, it supplies sheets 74 or films 75, one by one, from magazine 72. Each sheet or film is guided by a pair of register rollers 76 and supplied to platen 48. It is held against platen 48 by paper holding rollers 78 and 80 which are provided below and above platen 48, respectively. Magazine 72 can be inserted into, and removed from, housing 10 through a port cut in the front side of housing 10.

Further, a horizontal slot is cut in the front side of housing 10. This slot is continuous with manual paper-supplying device 82.

Figure 6:
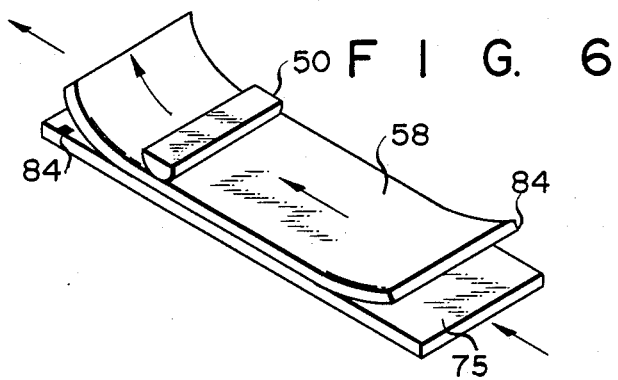
FIG. 6 shows a sheet of paper and an ink ribbon, explaining how an image is transferred to the sheet of paper.
Figure 7:
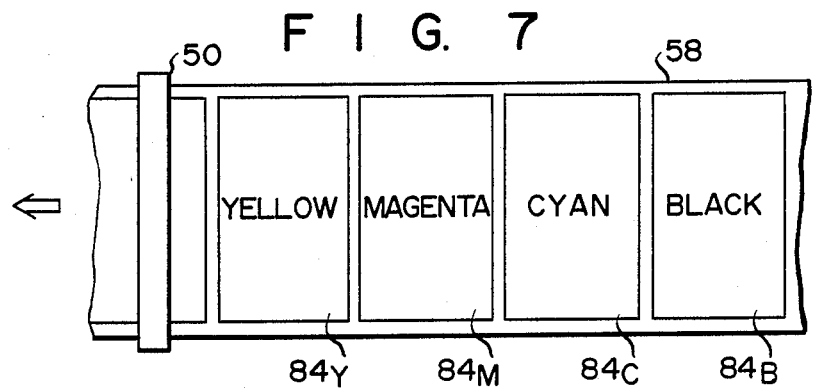
FIG. 7 is a plan view of an ink ribbon for copying a multicolor image by means of the image-forming apparatus shown in FIG. 1.

Thermal head 50 contacts the exposed portion of heat-transfer ink ribbon 58, which in turn contacts platen 48. Head 50 heats ribbon 58, thus melting ink layer 84 coated on ribbon 58 and printing data on sheet 74, as shown in FIG. 6. Ribbon 58 has the same width as sheet 74. As is shown in FIG. 7, it includes of yellow-ink region 84Y, magenta-ink region 84M, cyan-ink region 84C and black-ink region 84B. Yellow-ink region 84Y is first brought into contact with sheet 74, and head 50 prints an yellow image on sheet 74. Then, sheet 74 is returned to the position for starting printing, ribbon 58 is fed until magenta-ink region 84M is aligned with sheet 74. Head 50 prints a magenta image on sheet 74 on which the yellow image is printed. Sheet 74 is returned to the position for starting printing, and ribbon 58 is fed such a distance that cyan-ink region 84C is aligned with sheet 74. Head 50 then prints a cyan image on sheet 74 which the yellow and magenta images are printed. Thereafter, sheet 74 is returned to the position for starting printing, ribbon 58 is fed further, thus bringing black-ink region 84B into register with sheet 74. Thermal head 50 prints a black image on sheet 74 on which the yellow, magenta and cyan images are printed, thereby forming a multicolor image on sheet 74 of paper. Ribbon 58 can be replaced by a heat-transfer ink ribbon which has only yellow-ink, magenta-ink and cyan-ink regions. If this is the case, a substantially black image can be printed on sheet 74 by superposing a yellow image, a magenta image and a cyan image, one upon another.

Multicolor ink ribbon 58 is used to copy a color image on sheet 74, as has been described above. To prepare a film for making a printing plate, it suffices to use plastic film 75 and a monochromic ink ribbon, such as a black-ink ribbon. Needless to say, only black-ink region 84B of multicolor ink ribbon 58 can be used to form a monochromic image on the film.

To copy a color image on sheet 74, sheet 74 is moved first onto first guide plate 86 provided below copy tray 90 and extending slantwise along tray 90, and then onto second guide plate 88 provided below first guide plate 86 and extending parallel thereto. Sheet 74 is reciprocated in this way the same number of times as the number of colors of the color image. More specifically, sheet 74, whose front edge portions wrap around platen 48, is fed forward at a prescribed speed as the platen is rotated the in the forward direction by a pulse motor (not shown). Simultaneously, the heating elements (not shown) of head 50, which form a linear array, selectively operate in response to the output signals of photoelectric transducer 28, thereby printing the first-color image on sheet 74. As sheet 74 is gradually fed, its front edge portion is guided by first gate 94, provided between platen 48 and first guide plate 86, onto plate 86. When the first-color image is completely printed on sheet 74, platen 48 is rotated in the reverse direction, thereby feeding sheet 74 backwardly, from first guide plate 86. As sheet 74 is fed backward, its rear edge portion is guided by second gate 92, provided between platen 48 and second guide plate 88, onto plate 88. Then, platen 48 is rotated again in the forward direction, thus feeding sheet 74 forward for the second time. While sheet 74 is being fed forward and guided onto first guide plate 86 again, thermal head 50 prints the second-color image over the first-color image. Upon completion of this printing, platen 48 is rotated in the reverse direction, thus feeding sheet 74 to second guide plate 88. Platen 48 and thermal head 50 are further operated repeatedly in a similar manner, thereby to print other color images over the first-color image and the second-color image. When the multicolor image is printed on sheet 74, first gate 94 is rotated, thus guiding the printed sheet to a pair of paper-discharging rollers 96. Sheet 74 is nipped by these rollers 96 and is fed onto copy tray 90.

As has been mentioned above, a monochromic ink ribbon, such as a black-ink ribbon is used to prepare a film for making a printing plate. In this case, sheet 74 is not fed backwardly, since only one image is printed on the sheet. As soon as the image is printed, sheet 74 is supplied to copy tray 90.

Figure 8:
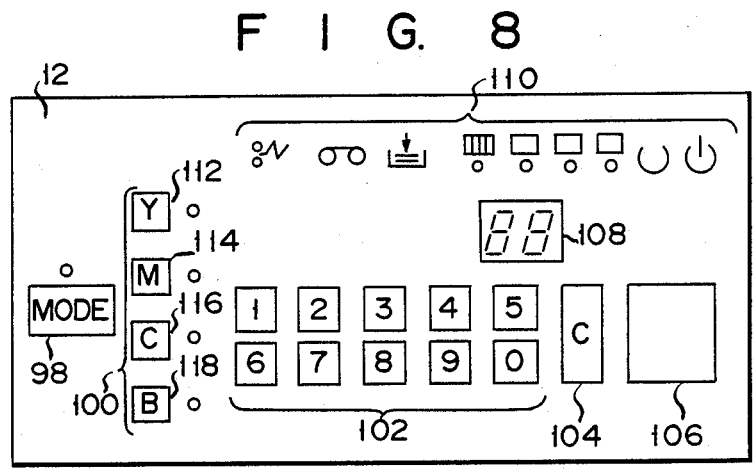
FIG. 8 is a plan view of the control panel of the image-forming apparatus illustrated in FIG. 1.

FIG. 8 shows control panel 12. Mode-selecting key 98, color-selecting unit 100, ten key section 102, clear key 104, and copy key 106 are provided on control panel 12. Key 98 is operated to select the multicolor printing mode or the monochromic printing mode. Color-selecting unit 100 is operated to select a color in which the monochromic printing will be performed. The numeric keys of ten key section 102 are selectively pushed to designate the desired number of copies. Clear key 104 is operated to clear various setting values such as the desired number of copies. Copy key 106 is depressed to start the copying operation. Digital display 108 and graphic display section 110 are also provided on control panel 12. Color-selecting unit 100 includes of Y key 112 for designating yellow, M key 114 for designating magenta, C key 116 for selecting cyan, and B key 118 for designating black.

FIG. 9 shows the control system of the color copier described above. This system comprises main control section 120, first sub-control section 122, and second sub-control section 124. Main control section 120 is coupled to both sub-control sections 122 and 124 to control these sub-sections. Main control section 120 is also connected to control panel 12, correction circuit 126, signal-splitting circuit 128, image quality-improving circuit 130, signal-converting circuit 132, and binary encoding circuit 134, to control panel 12 and circuits 126, 128, 130, 132 and 134.

First sub-control section 122 is coupled to light source control section 136, motor-control section 138, photoelectric transducer 28, analog-to-digital (A/D) converter 140, and resolution-changing section 142, to control these components. Light source control section 136 is coupled to lamp 26 to control this lamp. Motor control section 138 is connected to reversible motor 42 to control this motor.

Second sub-control section 124 is coupled to head temperature control section 144, thermal head 50, detection switches 146, and drive section 148, to control these components. Drive section 148 is connected to drive system 150 including motors, solenoids and the like, to control drive system 150.

Photoelectric transducer 28 has a number of CCD elements. The CCD elements are divided into a plurality of groups, each including of three CCD elements. The CCD elements of each group are provided with a cyan filter, a green filter and a yellow filter, respectively. The groups of CCD elements correspond to the respective picture elements of the image formed on original 24. Hence, photoelectric transducer 28 generates analog color signals, i.e., cyan signals, green signals and yellow signals, when it receives the light reflected from original 24. These analog color signals are supplied to A/D converter 140. Converter 140 converts the input signals into digital color signals, which are supplied to resolution changing section 142. Section 142 processes the input signals, such that the resolution of photoelectric transducer 28 is adjusted to that of thermal head 50. The signals, thus processed, are supplied to correction circuit 126.

The color signals, i.e., the cyan (C) signal, green (G) signal and yellow (Y) signal, supplied from resolution-changing section 142, are corrected by correction circuit 126, thereby eliminating the difference in magnitude among these signals, which has resulted from the characteristic difference of the CCD elements of photoelectric transducer 28. The color signals, thus corrected, are input to signal-splitting circuit 128. Circuit 128 processes the C signal, G signal and Y signal supplied from correction circuit 126, thus splitting each input signal into luminance signal I, color-difference signal C1 and color-difference signal C2. Signals I, C1 and C2 are supplied to image quality-improving circuit 130. Image quality-improving circuit 130 analyzes these input signals, and performs various image quality-improving processes on these signals, such as outline accentuation and character designation. Signals I, C1 and C2, thus processed, are then input to signal-converting circuit 132. Circuit 132 converts signals, I, C1 and C2 into a signal representing one of the three primary colors, (yellow, magenta and cyan), or a signal representing black (B). Main control section 120 selects yellow (Y), magenta (M), cyan (C) or black (B). The color signal, that is, the Y signal, M signal, C signal or B signal, is supplied to binary encoding circuit 134. Binary encoding circuit 134 carries out graduation conversion, i.e., binary encoding, on the Y, M, C or B signal supplied from signal-converting circuit 132, thereby outputting a binary-encoded signal. The binary-encoded signal is input to head temperature control section 144.

Head temperature control section 144 generates a print signal from the binary-encoded signal supplied from binary encoding circuit 134. The print signal is supplied to thermal head 50. In response to the print signal, thermal head 50 performs it function; that is, it prints an image.

Signal-converting circuit 132 will be described in greater detail, with reference to FIG. 10. As has been stated, signal-converting circuit 132 converts signals, I, C1 and C2 (supplied from image quality-improving circuit 130) into a color signal X representing yellow (Y), magenta (M), cyan (C) or black (B), and supplies color signal X to binary encoding circuit 134. The selection of a color is achieved by main control section 120. More specifically, main control section 120 gives two control signals a and b to signal-converting circuit 132. These control signals each have two logic values, "0" and "1". The possible combinations of the logic values of signals a and b will designate yellow (Y), magenta (M), cyan (C) and black (B), as is shown in the following table. When the image-forming apparatus is set to multicolor-copying mode, these four colors will be sequentially (for instance, first the color of yellow, then the color of magenta, next the color of cyan, and finally back). When the apparatus is set to the monochromic-copying mode, one of the color signals is selected by operating the corresponding key of color-selecting unit 100.

TABLE

| a | b | X |
|---|---|---|
| 0 | 0 | Y |
| 0 | 1 | M |
| 1 | 0 | C |
| 1 | 1 | B |

Figure 11A:
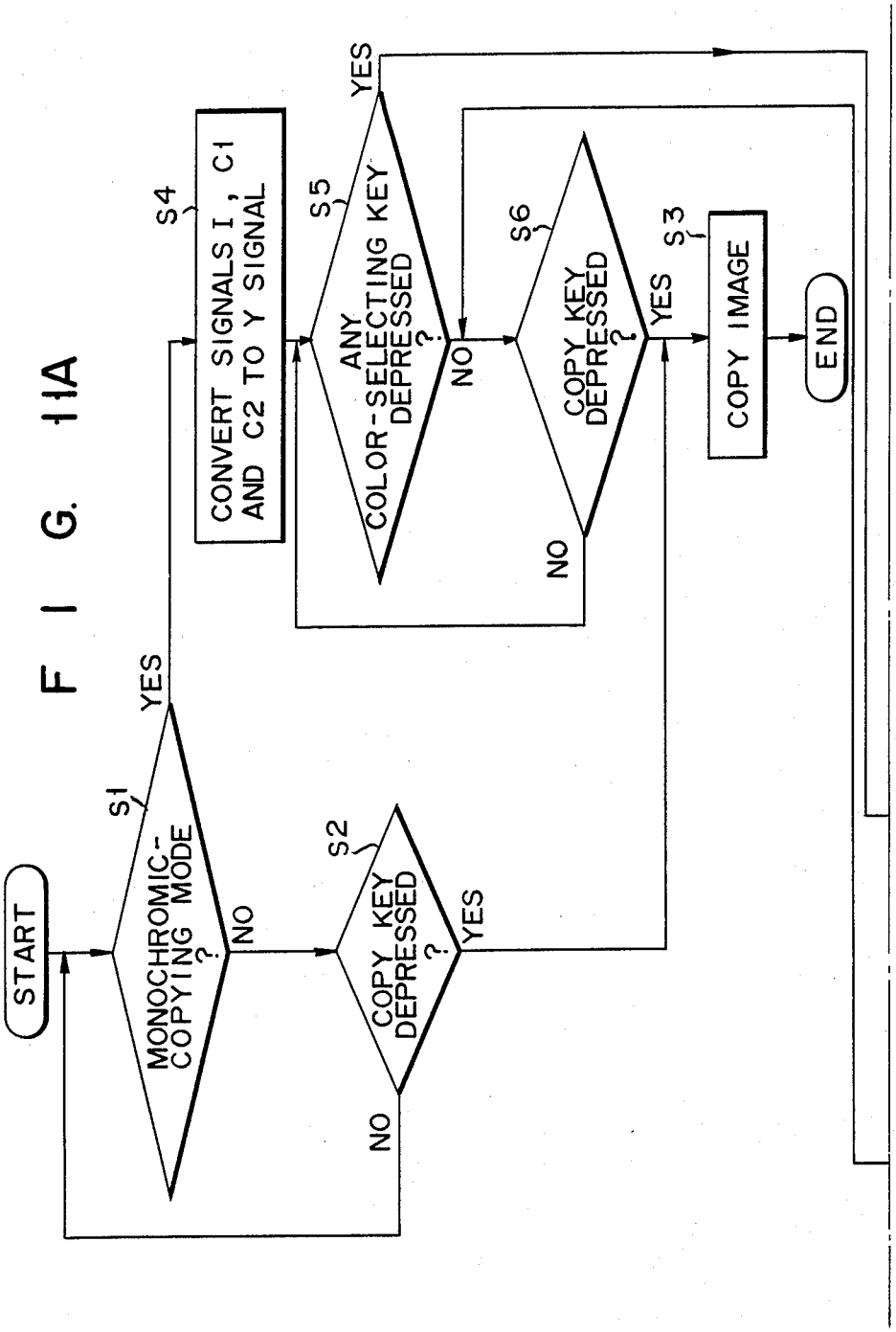

The operation of the thermal-printing color copier will now be explained with reference to the flow charts of FIGS. 11A and 11B. First, in step S1, it is determined whether or not the apparatus has been set to the monochromic-copying mode. If NO, that is, if the multicolor-copying mode has been selected, the operation goes to step S2. In step S2, it is determined whether or not copy key 106 has been depressed. If NO, the operation returns to step S1. If YES, the operation advances to step S3, in which the image formed on original 24 is copied on sheet 74 of paper. Since multicolor-copying has been selected in this case, a multicolor image is formed on sheet 74 by using heat-transfer ink ribbon 58 having yellow-ink region 84Y, magenta-ink region 84M, cyan-ink region 84C and black-ink region 84B (FIG. 7).

If YES in step S1, that is, a film for making a printing plate is to be prepared, the operation goes to step S4. In step S4, main control section 120 instructs signal-converting circuit 132 to convert signals I, C1 and C2 to a yellow (Y) signal. Thereafter, the operation goes to step S5. In this step, it is determined whether or not any key of color-selecting unit 100 has been depressed. If NO, step S6 is executed, thereby determining whether or not copy key 106 has been depressed. If NO, the operation returns step S5. If YES, the operation goes to step S3, in which a monochromic image, more precisely, a black image, is copies on film 75, by using a black ink ribbon. Since Y signal has been output from signal-converting circuit 134, the black image copied on film 75 corresponds to the yellow picture elements of the multicolor image formed on original 24. In this case, let us assume that the black ink ribbon has been inserted into the copier, and that magazine 72 containing plastic films 75 has been set within the color copier. Hence, a plastic film for making a printing plate is obtained, on which an image in black, corresponding to the yellow picture elements of the original, is printed or copied.

If it is detected in step S5 that any key of color-selecting unit 100 has been depressed, the operation advances to step S7. In step S7, it is determined whether or not the depressed key is Y key 112. If YES, the operation goes to step S8. In this step, main control section 120 instructs signal-converting circuit 132 to convert signals I, C1 and C2 to a Y (yellow) signal. Then, the operation returns to step S6. If it is determined in step S6 that copy key 106 has been depressed, the operation goes to step S3, whereby the image is copied. In this case, circuit 132 outputs a Y signal. The image copied on plastic film 75 corresponds to the yellow picture elements of the original image.

If NO in step S7, that is, if Y key 112 has not been depressed, the operation goes to step S9. In step S9, it is determined whether or not the depressed is M key 114. If YES, step S10 is executed, whereby main control section 120 instructs signal converting circuit 132 to convert signals I, C1 and C2 to an M (magenta) signal. Thereafter, the operation goes to step S6. If YES in step S6, step S3 is performed, thereby forming an image on plastic film 75. In this case, the output signal of circuit 132 is an M signal. Hence, the image formed on film 75 corresponds to the magenta elements of the original image.

If NO in step S9, that is, if M key 114 has not been depressed, the operation advances to step S11. In step S11, it is determined whether or not the depressed key is C key 116. If YES, step S12 is performed, whereby main control section 120 instructs signal-converting circuit 132 to convert signals I, C1 and C2 to a C (cyan) signal. Then, the operation goes to step S6. If copy key 106 has been depressed, the operation goes to step S3, whereby an image is copied on plastic film 75. Since the output signal of circuit 132 is a C signal in this case, the image copied on film 75 corresponds to the cyan elements of the original image.

If NO in step S11, that is, if C key 116 has not been depressed, the operation goes to step S13. In this step, it is determined that B key 118 has been depressed, and main control section 120 instructs signal-converting circuit 132 to convert signals I, C1 and C2 to a black (B) signal. Then, the operation advances to step S6. If copy key 106 has been depressed, the operation goes to step S3, whereby an image is copied on plastic film 75. Since the output signal of circuit 132 is a B signal, the image copied on film 75 corresponds to the black elements of the original image formed on original 24.

Hence, when the monochromic copying-mode is selected, four plastic films are prepared for making four plates, i.e., a yellow-plate, a magenta-plate, a cyan-plate and a black-plate, which will be used to print a multicolor image identical with the original image formed on original 24.

As has been explained, original 24 is optically scanned, thereby generating three kinds of color signals, i.e., cyan-signals, green-signals and yellow-signals. These signals are converted to Y (yellow) signals, M (magenta) signals, C (cyan) signals, and B (black) signals. The signal representing one of these colors is supplied to thermal head 50. Head 50 therefore prints, on film 75, a black image corresponding to picture elements of this color of the original image, by using a black-ink ribbon. The color copier, though relatively simple in structure, can easily prepare films for making printing plates for different colors. In addition, the copier is not only small, but also inexpensive.

In the first embodiment described above, one of the keys of color-selecting unit 100 is depressed to copy the image of the selected color on a plastic film 75 when the color copier is set to the monochromic-copying mode. That is, a key must be operated in order to prepare one film for making a printing plate. As has been mentioned, to print a multicolor image on sheets of paper, for black images, which correspond to the yellow elements, magenta elements, cyan elements and black elements of the original image, must be copied on four films. It is desirable that these four films be prepared, one after another, by operating a key only once.

Figure 12:
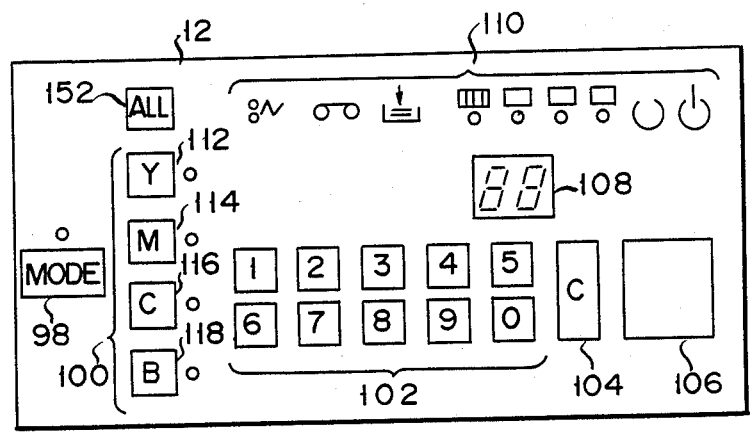
FIG. 12 shows the control panel of another image-forming apparatus according to a second embodiment of the invention.

FIGS. 12 and FIGS. 13A to 13C illustrate a second embodiment of the invention, another thermal-printing, color copier. As is shown in FIG. 12, the control panel 12 of this copier has print key 152. Except for this point, the copier is identical with the first embodiment. When print (ALL) key 152 is depressed in the monochromic-copying mode, main control section 120 causes signal-converting circuit 132 to output a Y signal, an M signal, a C signal and a B signal, one after another, thereby to prepare four films for making a yellow-printing plate, a magenta-printing plate, a cyan-printing plate, and a black-printing plate.

Figure 13A:
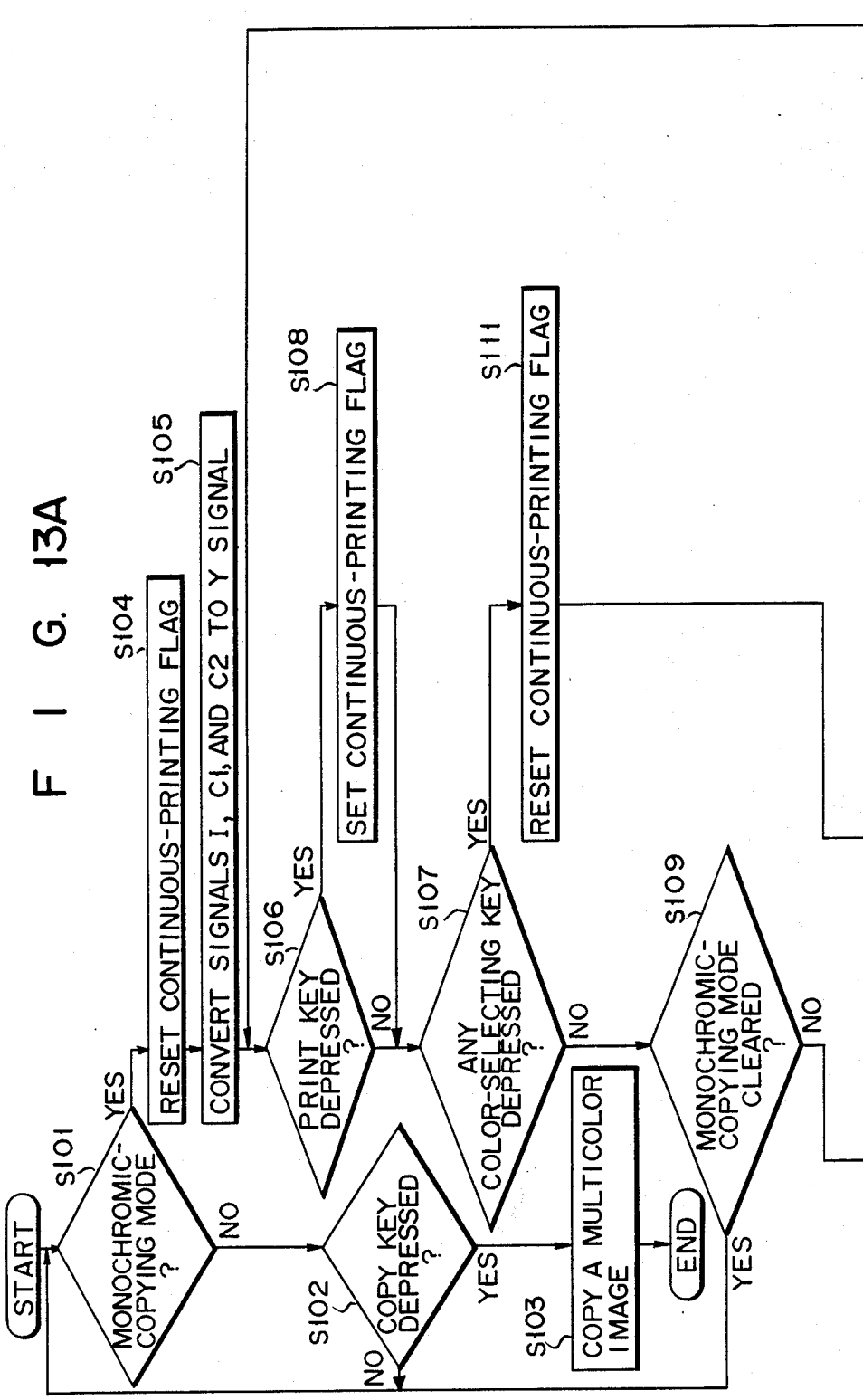
Figure 13C:
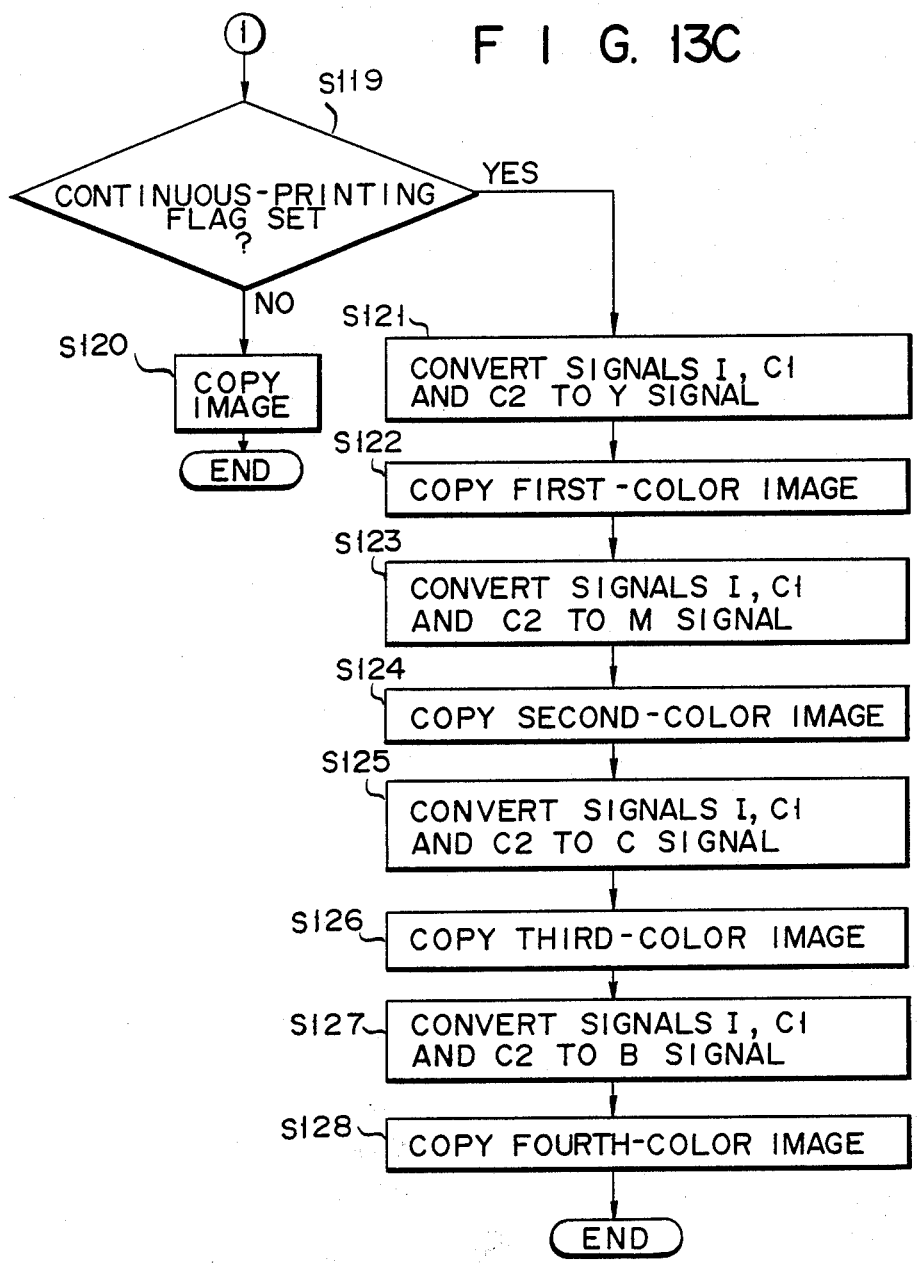

The operation of the second embodiment will be explained with reference to the flow chart shown in FIGS. 13A to 13C.

In step S101, it is determined whether or not the color copier has been set to the monochromic-copying mode. If NO, that is, if the copier has been set to the multicolor-copying mode, the operation goes to step S102. In step S102, it is determined whether or not copy key 106 has been depressed. If NO, the operation returns to step S101. If YES, the operation goes to step S103. In step S103, a multicolor image is copied on sheet 74, by using heat-transfer ink ribbon 58 having yellow-ink region 84Y, magenta-ink region 84M, cyan-ink region 84C and black-ink region 84B.

If YES in step S101, that is, if the color copier has been set to the monochromic-copying mode, the operation goes to step S104. In this step, a continuous-printing flag is reset. Thereafter, the operation advances to step S105. In step S105, main control section 120 instructs signal-converting circuit 132 to convert signals I, C1 and C2 to a Y (yellow) signal. Then, in step S106, it is determined whether or not print (ALL) key 152 has been depressed. If NO, the operation goes to step S107. If YES, the operation advances to step S108. In step S108, the continuous-printing flag is set. Thereafter, the operation goes to step S107. In this step, it is determined whether or not any key of color-selecting unit 100 has been depressed. If NO, the operation advances to step S109. In step S109, it is determined whether or not the monochromic-copying mode has been cleared. If YES in step S109, the operation returns to step S101. If NO, the operation goes to step S110. In step S110, it is determined whether or not copy key 106 has been depressed. If NO, the operation returns to step S106.

If YES in step S107, that is, if any key of color-selecting unit 100 has been depressed, the operation goes to step S111. In this step, the continuous-printing flag is reset. Thereafter, it is determined in step S112 whether or not Y key 112 has been depressed. If YES, the operation advances to step S113. In step S113, main control section 120 instructs signal-converting circuit 132 to convert signals I, C1 and C2 to a Y (yellow) signal. Then, the operation returns to step S106. If NO in step S112, that is, if Y key 112 has not been depressed, the operation goes to step S114. In step S114, it is determined whether or not M key 114 has been depressed. If YES, step S115 is executed, whereby main control section 120 instructs circuit 132 to convert signals I, C1 and C2 to an M (magenta) signal. Then, the operation returns to step S106. If NO in step S114, that is, if M key S114 has not been operated, the operation goes to step S116. In step S116, it is determined whether or not key C 116 has been depressed. If YES, the operation goes to step S117. In step S117, main control section 120 instructs signal-converting circuit 132 to convert signals I, C1 and C2 to a C (cyan) signal. Thereafter, the operation returns to step S106. If NO in step S116, that is, if C key 116 has not been depressed, the operation advances to step S118. In step S118, it is determined that B key 118 has been depressed, and main control section 120, therefore, instructs circuit 132 to convert signals I, C1 and C2 to a B (black) signal. Then, the operation returns to step S106.

If YES in step S110, that is, if copy key 106 has been depressed, the operation goes to step S119. In this step, it is determined whether or not the continuous-printing flag has been set. If NO in step S119, the operation proceeds to step S120, in which an image corresponding to the elements of the original image, which are of any designated color, is copied. Since the color copier is set to the monochromic-copying mode in this case, this image is copied on a film 75, by using a black-ink ribbon. When the designated color is yellow (Y), the image thus copied corresponds to the yellow picture elements of the original image. When the designated color is magenta (M), the image corresponds to the magenta picture elements of the original image. When the designated color is cyan (C), the image corresponds to the cyan elements of the original image. It is assumed that in this case, a black-ink ribbon has been inserted within the copier, and that magazine 72 contains a stack of plastic films 75. Hence, a film for making a plate for printing an image in the designated color can be prepared when print key 152 has not been operated, as in the color copier of the first embodiment.

If YES in step S119, that is, if the continuous-printing flag has been set, the operation goes to step S121. In step S121, main control section 120 instructs signal-converting circuit 132 to convert signals I, C1 and C2 to a Y (yellow) signal. Thereafter in step S122, thermal head 50 prints a first-color image in response to the print signal supplied from circuit 132, that is, an image corresponding to the yellow picture elements of the original image. As a result, a film for making a printing plate for printing a yellow image is prepared.

After the first-color image has been copied in step 122, the operation goes to step S123. In this step, section 120 instructs circuit 132 to convert signals I, C1 and C2 to an M (magenta) signal. Then, in step S124, thermal head 50 prints a second-color image in response to the print signals output from circuit 132. More specifically, an image corresponding to the magenta picture elements of the original image is copied on plastic film 75. Hence, this film can be used for making a printing plate for printing a magenta image.

After the second-color image has been copied in step S124, the operation advances to step S125. In step S125, section 120 instructs circuit 132 to convert signals I, C1 and C2 to a C (cyan) signal. Then, the operation proceeds to step S126, in which head 50 prints a third-color image. That is, an image corresponding to the cyan elements of the original image is copied on another plastic film 75. This copied film can be used for making a plate for printing the cyan image.

Further, step S127 follows step S126. In step S127, main control section 120 instructs circuit 132 to convert signals I, C1 and C2 to a B (black) signal. The operation then goes to step S128. In this step, a fourth-color image is printed on still another film by thermal head 50. This image corresponds to the black elements of the original image since circuit 132 has output a B signal. The copied film can be used to make a plate for printing the black image.

As has been described, films for making plates for printing images in different colors can be continuously prepared when print key 152 is operated. That is, the second embodiment can continuously copy four images of different colors, but in black, by using a black-ink ribbon, on four plastic films, respectively, when the monochromic-copying mode is selected, and print key 152 is depressed. Hence, the second embodiment can save time, as compared with the first embodiment, wherein color-selecting unit 100 must be operated in order to copy each copy of a different color in a plastic film.

Like the first embodiment, the second embodiment can also copy only one image of a desired color on a plastic film. Therefore, in the case where one of the four copied films turns out to be inferior in image quality, then it suffices to push that key of unit 100 which designates the color of the image, thereby to prepare a new film for making a plate for printing the image of that color. Needless to say, it is more economical to copy only one desired image on a film, than to continuously copy four images of different colors on four films.

If it does not matter, from an economical point of view, to copy four images of different colors on four films for the second time in case one of the four images previously copied on other four films is inferior in quality, then mode-selecting key 98 and color-selecting unit 100 can be dispensed with. In this case, it is sufficient for the operator to depress copy key 106 to copy a multicolor image, or to push print key 152 to continuously copy four images of different colors on four plastic films.

FIGS. 14 to 17 illustrate a third embodiment of the invention, i.e., still another thermal-printing, color copier, whose control panel 12 does not have print key 152, and which can, nonetheless, continuously copy images of different colors on plastic films, respectively. This color copier will now be described in detail, with reference to FIGS. 14 to 17.

Figure 14:
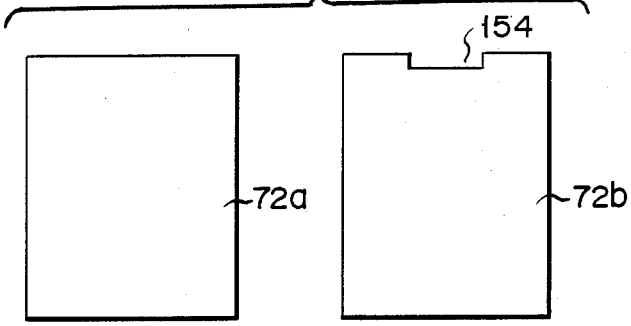
FIG. 14 represents the shape of a paper magazine and the shape of a film magazine, both used in an image-forming apparatus according to a third embodiment of the present invention.

In the third embodiment, two magazines 72a and 72b shown in FIG. 14 are used. Magazine 72a contains sheets of paper 74 for multicolor copying. Magazine 72b contains plastic films 75 for making printing plates. They have different shapes. As is shown in FIG. 14, film magazine 72b has depression 154 on its front side, whereas paper magazine 72a does not have such a depression.

Figure 15:
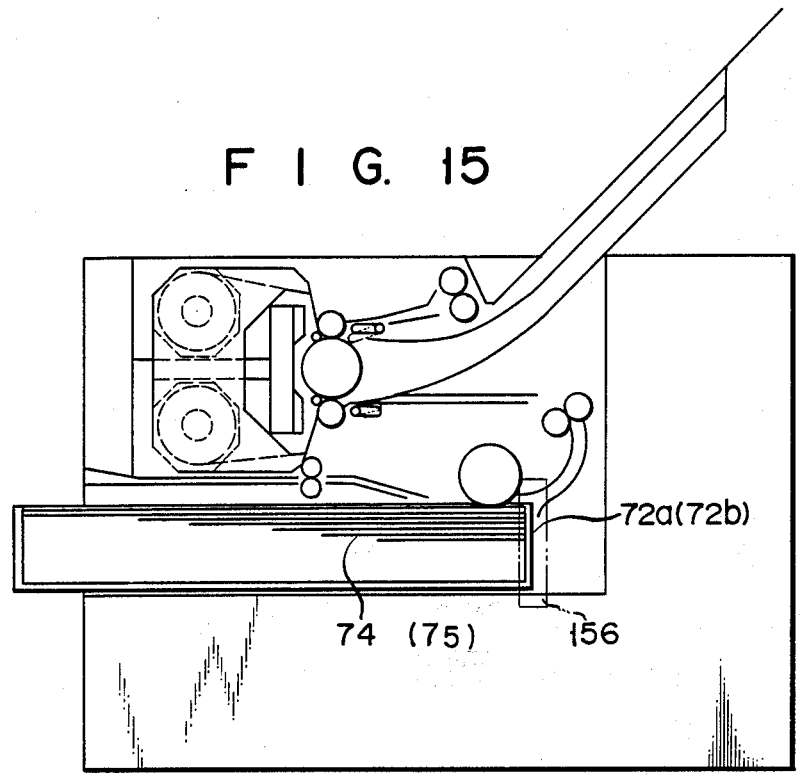
FIG. 15 is a cross-sectional view of the image-forming section of the apparatus according to the third embodiment.

As is shown in FIG. 15, detector 156 is provided within the color copier, at the position where the front side of either magazine 72a or 72b is located when the magazine is inserted in the copier. Detector 156 can be the known optical one comprising a light-emitting element and a light-receiving element. This detector is so positioned that the light beam from the light-emitting element passes through depression 154 of film magazine 72b, thus reaching the light-receiving element, but is blocked by the front portion of paper magazine 72a. Hence, detector 156 can detect which magazine has been inserted into the color copier, paper magazine 72a or film magazine 72b.

As is illustrated in FIG. 16, detector 156 is coupled to main control section 120. Section 120 can therefore determine, in accordance with the output signal of detector 156, which copying mode has been selected, the multicolor-copying mode, or the monochromic-copying mode. When section 120 determines that the multicolor-copying mode has been selected, images will be copied in different colors on one sheet 74 of paper. When it determines that the monochromic-copying mode has been selected, images of different colors will be copied on different plastic films 75, respectively.

In the third embodiment, when the monochromic-copying mode is selected, a yellow image, a magenta image, a cyan image and a black image will be copied, in the respective colors, on four plastic films 75, by using ink regions 84Y, 84M, 84C and 84B of ribbon 58 (FIG. 7).

The operation of the third embodiment will now be explained with reference to the flow chart of FIG. 17. First, in step S201, main control section 120 determines, in accordance with the output signal of detector 156, which magazine, magazine 72a or 72b, has been inserted in the color copier. If it determines that paper magazine 72a containing sheets 74 has been inserted in the copier, it is assumed that the multicolor-copying mode has been selected. In this case, the operation goes to step S202. In step S202, it is determined whether or not copy key 106 has been depressed. If NO, the operation returns to step S201. If YES, the operation advances to step S203. In step S203, thermal head 50 copies a multicolor image on sheet 74a which is identical the image on original 24.

If section 120 determines, in step S201, that film magazine 72b containing films 74b has been inserted in the color copier, it is assumed that the monochromic-copying mode has been designated. Then, the operation proceeds to step S204. In step S204, it is determined whether or not copy key 106 has been depressed. If NO, the operation returns to step S201. If YES, the operation goes step S205.

In step S205, main control section 120 instructs signal-converting circuit 132 to convert signals I, C1 and C2 to a Y (yellow) signal. Then, in step S206, thermal head 50 copies on a first plastic film 74b a yellow image corresponding to the yellow picture elements of the original image, by using yellow-ink region 84Y of heat-transfer ink ribbon 58. Thereafter, the operation goes to step S207.

In step S207, section 120 instructs circuit 132 to convert signals I, C1 and C2 to an M (magenta) signal. In step S208, thermal head 50 copies on a second plastic film 74b a magenta image corresponding to the magenta elements of the original image, by using magenta-ink region 84M of ink ribbon 58. The operation advances to step S209.

In step S209, section 120 instructs signal-converting circuit 132 to convert signals I, C1 and C2 to a C (cyan) signal. Then, the operation goes to step S210. In this step, thermal head 50 copies on a third plastic film 74b a cyan image corresponding to the cyan elements of the original image, by using cyan-ink region 84C of ribbon 58. Thereafter, the operation proceeds to step S211.

In step S211, main control section 120 instructs circuit 132 to convert signals I, C1 and C2 to a B (black) signal. Then, in step S212, thermal head 50 copies on a fourth plastic film 74b a black image corresponding to the black picture elements of the original image, by using black-ink region 84B of ink ribbon 58.

As has been stated above, in the third embodiment, it is automatically determined which copying mode, the multicolor-copying mode or the monochromic-copying mode, has been selected. Therefore, it is unnecessary to provide mode-selecting key 98 and print key 152. In addition, four images of different colors can be continuously copied on four plastic films, by using the four ink-regions (of different colors) of a multicolor, heat-transfer, ink ribbon. Hence, unlike in the first and second embodiments, there is no need to replace the multicolor ink ribbon with a black-ink ribbon in order to copy on four films four images (all in black) which correspond to the yellow elements, magenta elements, cyan elements and black elements of the original image, respectively. The third embodiment can, thus, copy multicolor images on sheets of paper, and can also efficiently prepare films for making printing plates. Furthermore, since the four images are copied on four films in yellow, magenta, cyan and black, respectively, it is easy to understand which film will be used to make a plate for printing an image in a specific color. Further, it is possible to predict the color-reproducibility of a print, by superposing the four films, one upon another. Nevertheless, the four images can, of course, be copied on four films, all in black, by using a black ink ribbon, as in the first and second embodiments.

In the third embodiment, film magazine 72b has depression 154 on its front side. Instead, as is shown in FIG. 18, one projection 160 can be provided on the front side of magazine 72b, close to two projections 158 which are formed also on the front side to indicate the size of sheets of paper, whereas only two projections 158 are provided on the front side of paper magazine 72a. In this case, it is determined which copying-mode has been selected, in accordance with the presence or absence of projection 160 on the front side of the magazine inserted in the color copier.

Further, magazines 72a and 72b can be painted in different colors, so that the color of either magazine is detected thereby to determine the selected copying-mode.

Alternatively, a mark can be printed on plastic films 75, and can be detected to determine that the monochromic-copying mode has been selected. More particularly, as shown in FIGS. 19 and 20, bar codes 162 can be printed on the edge portions of films 75, whereas no marks are printed on sheets 74 of paper.

In the first, second and third embodiments, images of different colors are copied on respective films in the same density. The present invention is not limited to this method. These images can be copied in such different densities that, in making printing plates, light can be applied to the plates through these films for the same period of time.

What is claimed is:

1. An image-forming apparatus capable of scanning a multicolor original image and forming images of different colors on image-forming media, respectively, said apparatus comprising:
   scanning means for scanning the original image and generating colors signals representing different colors;
   signal-converting means for converting the color signals generated by said scanning means to image-forming signals representing different colors;
   image-forming means responsive to one of the image-forming signals supplied from said signal converting means, for forming a color image on an image-forming medium, by using an image-transfer medium color represented by the image-forming signal;
   selecting means for selecting an ordinary image-forming mode or a continuous image-forming mode for continuously forming corresponding color images on image-forming media by using the image-transfer medium, the number of the images being the same as the image-forming signals representing different colors obtained by said signal-converting means, and the number the number of image-forming media being the same as the image-forming signals and
   control means for causing said image-forming means to continuously form as many corresponding color as the image-forming signals obtained by said signal-converting means on as many image-forming media as the corresponding color image-forming signals, by using the image-transfer medium, when said selecting means selects continuous image-forming mode.

2. The image-forming apparatus according to claim I, wherein said control means supplies, one by one, the image-forming signals from said signal converting means to said image-forming means, thereby said image-forming means forming as many images as the image-forming signals.

3. The image-forming apparatus according to claim 1, wherein said selecting means includes a change-over switch, provided on a control panel, for selecting the ordinary image-forming mode or continuous image-forming mode.

4. The image-forming apparatus according to claim 1, wherein said image-transfer medium includes a multicolor image-transfer medium, and said control means causes said image-forming means to continuously form as many images as the image-forming signals on as many image-forming media as the image-forming signals, by using the multicolor image-transfer medium to form corresponding color images represented by the image-forming signals, when said continuous image-forming mode is selected by said selecting means.

5. The image-forming apparatus according to claim 4, wherein said selecting means comprise judging means for determining whether said image-forming media are sheets of paper or plastic films, and means for selecting said continuous image-forming mode when said judging means determines that said image-forming are plastic films.

6. An image-forming apparatus for forming an image on an image-forming medium, comprising:
   signal-converting means for receiving a plurality of color signals and converting these color signals to image-forming signals representing different colors;
   image-forming means responsive to one of the image-forming signals supplied from said signal-converting means, for forming a color image on an image-forming medium by using an image-transfer medium;
   selecting means for selecting an ordinary image-forming mode or a continuous image-forming mode for continuously forming corresponding color on image-forming media by using the image-transfer medium, the number of the images being the same as the number of image-forming signals representing different colors obtained by said signal-converting means, and the number of the image-forming media being the same as the number of image-forming signals; and
   control means for causing said corresponding color image-forming means continuously form as many images as the image-forming signals obtained by said signal-converting means on as many image-forming media as the image-forming signals, by using the image-transfer medium, when said selecting means selects the continuous image-forming mode.

7. The image-forming apparatus according to claim 6, wherein said control means supplies, one by one, the image-forming signals from said signal-converting means to said image-forming means, thereby said image-forming means forming as many images as the image-forming signals.

8. The image-forming apparatus according to claim 7, wherein said selecting means includes a change-over switch, provided on a control panel, for selecting the ordinary image-forming mode or the continuous image-forming mode.

9. The image-forming apparatus according to claim 6, wherein said image-transfer medium includes a multicolor image-transfer medium, and said control means causes said image-forming means, to continuously form as many images as the image-forming signals on as many image-forming media as the image-forming signals, by using the multicolor image-transfer medium to form corresponding color images represented by the image-forming signals, continuous image-forming mode is selected by said selecting means.

10. The image-forming apparatus according to claim 9, wherein said selecting means comprises judging means for determining whether said image-forming media are sheets of paper or plastic films, and means for selecting said continuous image-forming mode when said judging means determines that said image-forming media are plastic films.

11. A method for preparing films for use in making printing plates for offset lithography, said method comprising the steps of:
scanning an original image and generating color signals representing different colors;
converting the color signal to image forming signals representing different color;
forming an image, on an image-forming medium, by using an image transfer medium of the color represented by the image-forming signal selecting an ordinary image-forming mode or a continuous image-forming mode for continuously forming corresponding color images on films by using a image-transfer medium, the number of the images being the same as the number of image-forming signals representing different colors, and the number of films being the same as the number of image-forming signals; and
continuously forming as many images as there are color image-forming signals responsive to each of the image-forming signals, on as many films as the image-forming signals by using the image-transfer medium when said continuous image-forming mode is selected in the selecting step.

12. The method according to claim 11, wherein said image-transfer medium includes a multicolor image-transfer medium, and said continuous forming step includes a step of continuously forming as many images as there are image forming signals on as many image-forming media as the image-forming signals, by using the multicolor image-transfer medium to form corresponding color images represented by the image-forming signals, when said continuous image-forming mode is selected in said selecting step 13. The method according to claim 12, wherein said selecting step includes the steps of determining whether said image forming media are sheets of paper or plastic films, and selecting the multicolor image-forming mode when said image-forming media are found to be plastic films.

* * * * *